United States Patent [19]

Hiebert

[11] Patent Number: 5,181,479

[45] Date of Patent: Jan. 26, 1993

[54] FISH EGG AND LARVAE COLLECTION SYSTEM

[75] Inventor: Steven D. Hiebert, Golden, Colo.

[73] Assignee: The United States of America as represented by the Secretary of the Interior, Washington, D.C.

[21] Appl. No.: 832,833

[22] Filed: Feb. 7, 1992

[51] Int. Cl.$^5$ .................... A01K 61/00; A01D 44/00
[52] U.S. Cl. ........................... 119/3; 119/2; 56/9; 43/103
[58] Field of Search .............. 119/3, 2, 4; 56/8, 9; 37/55, 57; 43/100, 103, 104

[56] References Cited

U.S. PATENT DOCUMENTS

| | | | |
|---|---|---|---|
| 3,462,858 | 8/1969 | Francklyn | 56/9 |
| 3,871,332 | 3/1975 | Hayashi | 119/3 |
| 3,902,457 | 9/1975 | Musgrove et al. | 119/3 |
| 3,967,585 | 7/1976 | Monaco | 119/2 |
| 4,351,438 | 9/1982 | Morton | 119/3 |
| 4,434,572 | 3/1984 | Sheldon et al. | 56/9 |
| 4,676,893 | 6/1987 | Travade et al. | 119/3 |
| 5,097,795 | 3/1992 | Adey | 119/3 |

Primary Examiner—John G. Weiss
Attorney, Agent, or Firm—E. Philip Koltos

[57] ABSTRACT

A system for continuously collecting and preserving fish eggs and larvae by pumping, concentrating, separating, and preserving samples for a specific period of time or volume. Water containing fish eggs and larvae is pumped by a centrifugal pump through smooth-walled plumbing into a headbox. Water flows out of the headbox over a sheet-metal ogee crest down over an inclined panel and then across a wedge-wire screen. Water with retained material drops through smooth-walled plumbing and a swing-joint union into a diverter arm. The swing-joint union is coupled through a chain and sprocket to a stepper motor programmable to position the diverter arm over each of the sample buckets. A peristaltic pump operates on a preset time and delivers a calculated concentration of formalin to a previously filled sample bucket.

8 Claims, 1 Drawing Sheet

FISH EGG AND LARVAE COLLECTION SYSTEM

BACKGROUND OF THE INVENTION

1. Field of the invention

This invention relates generally to the field of fishery studies where egg and larvae density, survival, and development and/or timing and duration of fish reproduction are necessary, and more particularly to a method and apparatus for unattended, continuous collection and preservation of fish egg and larvae samples.

2. Prior art of interest

In both environmental impact studies and marine biological research programs, it is very often necessary to determine the abundance and distribution of fish life at various depths along the water column. Past practices relating to collecting small aquatic animals or larvae in large quantities fail to provide reliable data on fish spawning that is missed with conventional daily or weekly sampling. One such sampler is disclosed in U.S. Pat. No. 3,967,585 to Monaco which discloses a larvae collection system which comprises a container for water being open at one end and closed at the other, a fluid inlet means to the container, a fluid conduit means positioned within and extending about the vertical length of the container and passing through the bottom of the container, a fluid outlet means positioned in the upper portion of the conduit, and a screening means positioned between the side walls of the container and the fluid outlet means so that the animals are retained in the container in sufficient water, while excess water passes through the screen and out the outlet means.

U.S. Pat. No. 3,040,980 to Mann et al discloses a method and apparatus for counting mobile aquatic creatures comprising a first enclosure to confine and guide aquatic creatures to be counted to a short conduit or tube having windows on each side for the passage of a light beam passing from window to window. A light source and a photo electric responsive device are used to count the creatures.

U.S. Pat. No. 4,718,192 to Louk discloses a hydromechanical bait trap including a field of prearranged conduit sections or runs and the conduit assembly includes inlet and outlet ends. The conduit assembly is designed to be supported adjacent the bottom of a shallow pond and includes a partially submerged mesh sump into whose lower portion the inlet end of the conduit assembly opens and the outlet end of the conduit assembly discharges downwardly into the sump, the sump being adapted to receive ground or finely cut-up bait. A pump is serially connected in the inlet and the conduit sections comprising the field include a plurality of lateral branches opening into the runs and mounted therefrom for annular displacement thereabouts between lower generally horizontal positions and upstanding upright positions projecting above the pond water level. The free ends of the lateral branches include marine trap structures and structure is provided for simultaneously raising and lowering the lateral branches.

Other prior art devices for sorting or grading marine life are shown by U.S. Pat. No. 3,096,600 to Gwyther, U.S. Pat. No. 4,028,821 to Hanks, U.S. Pat. No. 4,198,925 to Lindberg, U.S. Pat. No. 4,351,127 to Mitchell, and U.S. Pat. No. 4,986,021 to Thomas. None of the prior art devices are specifically designed for continuous egg and larvae collection. Automatic plankton samplers have limited ability to collect fish eggs and larvae because they are not designed to filter larger volumes of water continuously and have smaller mesh filter screens.

The fish egg and larvae collection system of the present invention solves the problems presented by the prior art by the novel use of methods to gently handle eggs and larvae, increase frequency of sample, automate preservation and simplify operation so it could be run by non-technical field workers.

SUMMARY OF THE INVENTION

The apparatus of this invention is designed to sample fish eggs and larvae and has the ability to filter larger volumes of water, to take samples continuously without interruption, and the samples are live-preserved and not pressed into a screen or gauze matrix. The apparatus is portable and boat mounted and the filtration and diverting portions of the sampler are above surface in an open configuration where any malfunction is obvious and maintenance can be performed easily. The collection system of the invention includes the application of a stepper motor in conjunction with a swing joint union and chain drive to divert and separate samples on a timed or volumetric basis, the use of wedge wire screen and its self cleaning ability to filter water to obtain egg and larval samples, and special attention at plumbing junctions to provide smooth inside transitions to prevent damage to eggs and larvae.

It is an object of the invention to provide an apparatus for the continuous collection and preservation of fish egg and larvae samples.

It is another object of the invention to provide apparatus for filtering large volumes of water, for taking samples continuously without interruption and for preserving the fish eggs and larvae samples.

A still further object of the invention is to provide apparatus for the collection and preservation of fish egg and larvae samples which is portable and boat mounted and the filtration and diverting portions of the sampler are above surface.

These and other objects will become more clear upon a consideration of the following description of a preferred embodiment.

DESCRIPTION OF THE PREFERRED EMBODIMENT

Figure 2:
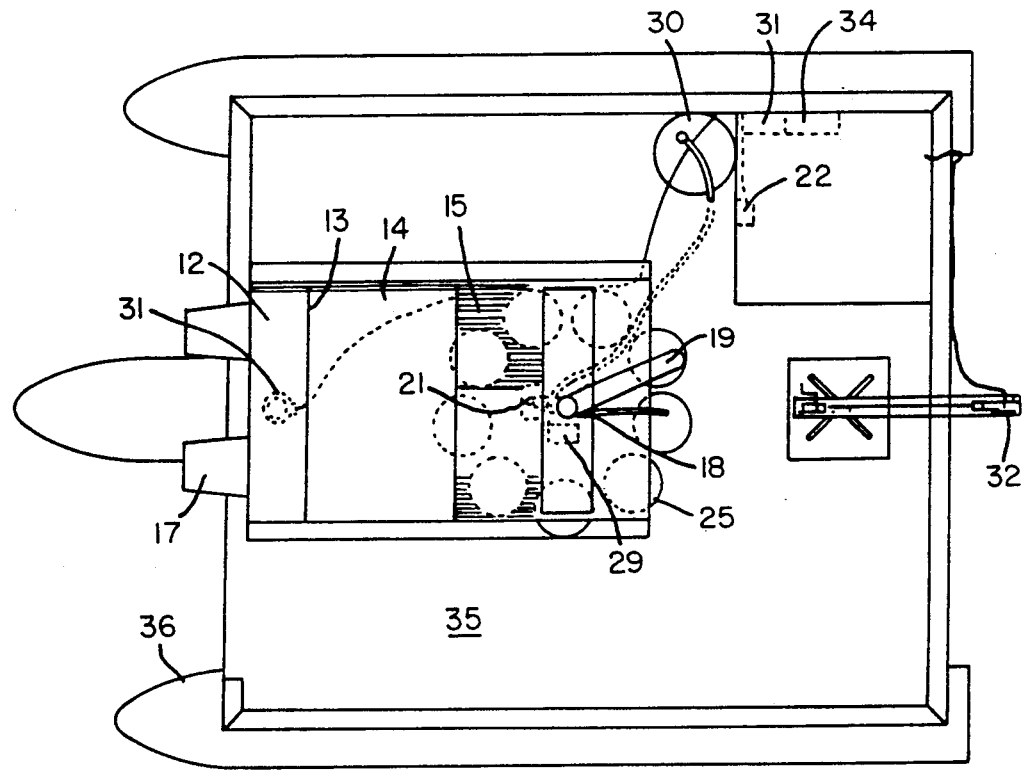
FIG. 2 is a top view of the fish egg and larvae collection system in accordance with the present invention.

As shown in the drawings, the apparatus may be used at any Government or private water control pumping or diversion facility where knowledge of density of fish egg and larvae passage is needed for mitigation, operation, management, or research. More specifically, the apparatus was initiated by a need for a method of continuously monitoring densities of striped bass eggs and larvae during the spring in the Sacramento River, Calif. Continuous collection of fish eggs and larvae provide reliable data on fish spawning that is missed with conventional daily or weekly sampling. Continuous monitoring of the timing and quantity of eggs and larvae passing a point can be potentially used to enact protective operation measures to move eggs and larvae to nursery areas.

Figure 1:
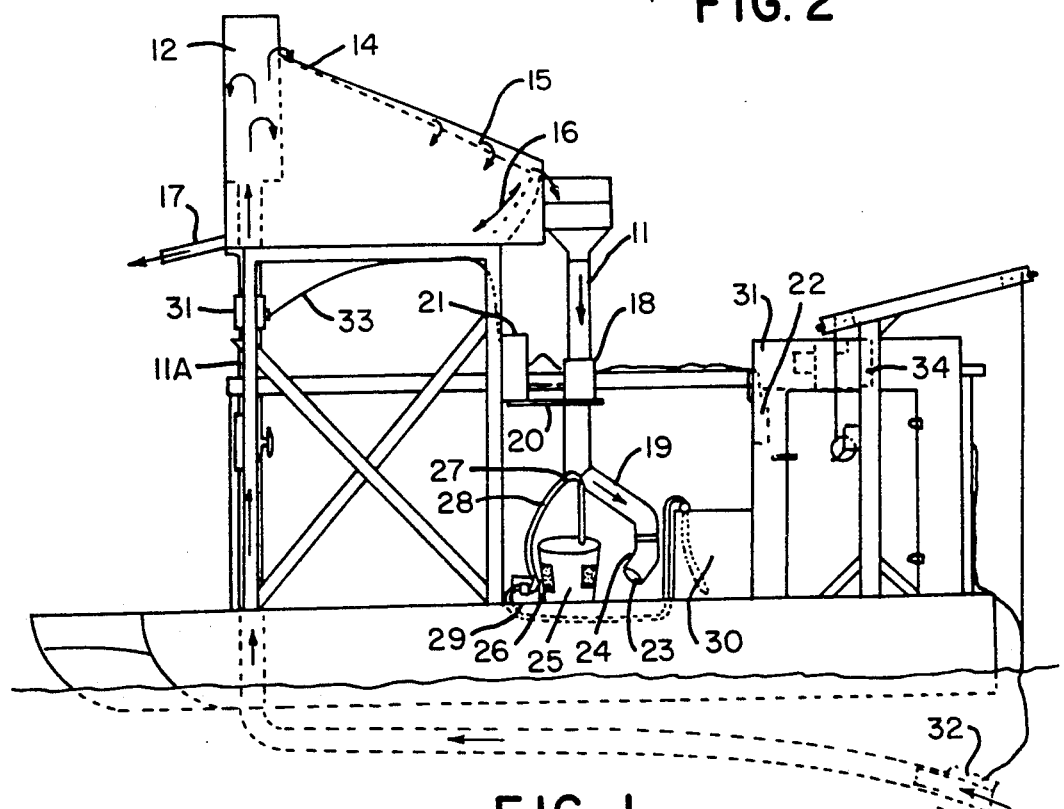
FIG. 1 is a side view of the fish egg and larvae collection system in accordance with the present invention.

Referring to FIGS. 1 and 2 the apparatus is shown in water containing fish eggs and larvae which is pumped with a centrifugal screw-impeller type pump (not shown) from a single or multiple depth up through smooth-walled plumbing 11a into a headbox/energy dissipator 12. The flow of water out of the top of the headbox 12 is over a sheet-metal ogee crest 13, down over an inclined solid plastic or metal panel 14 and then across a specific opening wedge-wire screen 15. In a preferred embodiment, the screen 15 consisted of a 250 micron screen.

The plastic or metal panel 14 distributes the water into sheetflow before the flow reaches the wedge-wire screen 15. The wedge-wire screen 15 is oriented with bars and openings parallel to the water flow to make use of the screen's self-cleaning ability. This also provides a gentle sheetflow down the bars. Dewatering effectiveness is determined by the adjusted angle 16 of the screen 15 and the surface area of the prescreen plastic material panel 14. The less surface area of the prescreen panel 14 the more sample water is dewatered. Water passing through the screen 15 is discharged back into the river, canal or lake through conduit 17. About 5 percent of the water must flow off the downstream end of the screen 15, carrying with it 100 percent of the material retained by the screen 15 from the volume of water pumped.

Water with retained material drops through smooth-walled plumbing 11 and a swing-joint union 18 into the diverter arm 19. The swing-joint union 18 is coupled through a chain and sprocket 20 to a stepper motor 21. The stepper motor controller 22 is programmable to move the stepper motor 21, with attached swing-joint union 18, forward or reverse, with any angle increment and hold position for any specified duration. From the swing joint union 18 to the outlet 23, the resulting pipe is now the sample diverting arm 19 ending in a flexible rubber tube 24 that gradually turns the water down into the sample collection buckets 25.

The sample diverting arm 19 maintains position over a sample bucket 25 for a specified period of time or volume, continually running water into the sample collection bucket 25 until rotation of the stepper motor 21/swing joint union 18 moves the diverter arm 19 to the next sample collection bucket 25. The diverter arm 19 moves quickly to the next sample collection bucket 25 with negligible spill through the rubber tube 24 outlet 23.

Sample collection buckets 25 are screened with the same mesh opening as the wedge-wire screen 15 with the screen 26 sealed in the bucket 25, ⅓ of the way from the bottom of the bucket 25 to provide space for sample retention.

The sample diverter arm 19 has a short length of plastic pipe 27, oriented along the trailing side of the diverter arm 19, positioned over the previously filled sample bucket 25. The plastic pipe 27 is attached to tubing 28 connected to a peristaltic pump 29 and container 30 filled with diluted formalin. The peristaltic pump 29 operates on a preset time and delivers a calculated concentration of formalin to the previously filled sample bucket 25 after the diverter arm 19 has moved to begin filling a new sample bucket 25. The tubing 28 from peristaltic pump 29 is capable of rotating within the pipe 27 attached to the diverter arm 19 to deliver the formalin to each collection bucket 25.

An inline flowmeter 31 is installed within the inflow plumbing 11a from the centrifugal pump 32. The output signal from the flow meter 31 is connected via line 33 to a resettable display and data logging recorder 34 to obtain the volume represented per sample.

Preliminary setup prior to the operation of the continuous fish egg and larvae collector includes: programming the angle increment and duration between sample collection buckets 25 into the stepper-motor controller 22; positioning collection buckets 25 at set locations in the sample diverter arm 19 swing circle; moving the diverter arm 19 to a starting position by hand; starting the pump 32; starting the stepper motor 21, and recording the time and flow rate.

The collection unloading procedure includes: recording time and pump flow rate; stopping the pump 32 if a complete shut down is necessary; and washing the contents of individual collection buckets 25 into separate, labeled, sample storage bottles.

In a preferred embodiment, the collection system was installed on a platform 35 affixed across three floatable pontoons 36. In an alternate embodiment, the collection system could include building the system in a permanent location and gravity-flowing water rather than pumping water through the wedge wire screen 15. Alternative embodiments of the system include a similar design that uses a standard conical style plankton net instead of the wedge-wire screen 15 for filtration of the water to collect eggs and larvae. By mounting the net within a tank, pumping water through the net, and frequently dumping the net's contents through the swing joint union 18 and diverter arm 19 assembly into collection buckets 25, a similar quality sample could be obtained. This alternative design would have periods of no sampling between dumps and could have frequent cleaning interruptions.

While the present invention has been shown and described herein in what are conceived to be the most practical and preferred embodiments it is recognized that departures may be made therefrom within the scope of the invention, which is therefore not to be limited to the details as disclosed herein.

What is claimed is:

1. A system for the collection and preservation of fish eggs and larvae samples comprising:
   means for continuously passing water containing fish eggs and larvae into an energy dissipator,
   means for distributing said water into sheet flow,
   means for dewatering and retaining said fish eggs and larvae samples,
   means for diverting said samples into a plurality of sample collection means, and
   means for preserving said samples.

2. A system of claim 1 wherein said means for distributing said water into sheet flow comprises a flat screen.

3. A system of claim 1 wherein said means for dewatering and retaining said samples comprises a wedge-wire screen oriented with bars and openings parallel to said water flow.

4. A system as described in claim 3 wherein said wedge-wire screen is angularly adjustable.

5. A system as described in claim 1 wherein said means for diverting said samples comprises a diverter arm coupled through a chain and sprocket to a stepper motor.

6. A system as described in claim 1 wherein said means for preserving said samples comprises a peristaltic pump operating on a preset time and delivering a calculated concentration of formalin to said sample collection means.

7. A system for the collection and preservation of fish eggs and larvae samples comprising:
  means for continuously passing water flow containing fish eggs and larvae over a sheet metal ogee crest and over an inclined solid panel,
  an angularly adjustable flat, wedge-wire screen, oriented with bars and openings parallel to said water flow for dewatering and retaining said samples,
  a diverter arm coupled through a chain and sprocket to a stepper motor, programmed for diverting said samples into a plurality of sample collection means, and
  a peristaltic pump operating on a preset time and delivering a calculated concentration of formalin to said sample collection means.

8. A process for collecting and preserving fish eggs and larvae samples comprising the steps of:
  pumping a life sustaining amount of water along with said fish eggs and larvae into a container for dissipating energy,
  distributing said water into sheet flow,
  dewatering and retaining said fish eggs and larvae samples,
  diverting said samples into a plurality of sample collection means, and
  preserving said samples with a calculated concentration of formalin.

* * * * *